United States Patent
Osga et al.

(10) Patent No.: US 7,555,904 B1
(45) Date of Patent: Jul. 7, 2009

(54) THERMALLY COMPLIANT RIVET CONNECTION FOR CONNECTING TURBINE ENGINE LINER TO CONVERGENT FLAP AND SEAL FOR TURBINE NOZZLE

(75) Inventors: Kyle J. Osga, Windham, CT (US); Edward A. Krystowski, Granby, CT (US)

(73) Assignee: United Technologies Corporation, Hartford, CT (US)

( * ) Notice: Subject to any disclaimer, the term of this patent is extended or adjusted under 35 U.S.C. 154(b) by 537 days.

(21) Appl. No.: 11/540,309

(22) Filed: Sep. 29, 2006

(51) Int. Cl.
*F02K 1/00* (2006.01)
(52) U.S. Cl. .................. 60/771; 60/770; 60/226.1; 239/265.39
(58) Field of Classification Search .................. 60/771, 60/770, 226.1, 796; 239/265.33, 265.37, 239/265.39, 265.41
See application file for complete search history.

(56) References Cited

U.S. PATENT DOCUMENTS

| 2,969,641 | A | * | 1/1961 | Schaefer | 239/127.3 |
| 3,592,389 | A | * | 7/1971 | Johnson | 239/265.27 |
| 3,972,475 | A | * | 8/1976 | Nelson et al. | 239/127.3 |
| 4,641,783 | A | * | 2/1987 | Camboulives | 239/265.39 |
| 5,484,105 | A | * | 1/1996 | Ausdenmoore et al. | 239/127.3 |
| 5,779,152 | A | * | 7/1998 | Renggli et al. | 239/265.33 |
| 7,117,682 | B1 | * | 10/2006 | Sevi et al. | 60/771 |
| 7,377,099 | B2 | * | 5/2008 | Cowan et al. | 60/230 |
| 2008/0078163 | A1 | * | 4/2008 | Burdick et al. | 60/226.1 |

* cited by examiner

*Primary Examiner*—Michael Cuff
*Assistant Examiner*—Vikansha S Dwivedi
(74) *Attorney, Agent, or Firm*—Carlson, Gaskey & Olds PC

(57) ABSTRACT

A bracket for attaching a liner to the divergent flaps and seals in a gas turbine engine convergent/divergent nozzle includes a rivet connection. There is clearance between a rivet and an opening in the bracket. This clearance allows for thermal expansion in both an axial and a radial invention.

14 Claims, 3 Drawing Sheets

THERMALLY COMPLIANT RIVET CONNECTION FOR CONNECTING TURBINE ENGINE LINER TO CONVERGENT FLAP AND SEAL FOR TURBINE NOZZLE

This invention was made with government support under U.S. Navy Contract No. N00019-02-C-3003. The government therefore has certain rights in this invention.

BACKGROUND OF THE INVENTION

This application relates to a bracket for attaching liners to the convergent flaps and seals which are part of a convergent/divergent nozzle for a gas turbine engine, and wherein the bracket connections are more thermally compliant than in the prior art.

A gas turbine engine typically includes a plurality of sections, which are positioned in series. A fan section moves air downstream towards a compressor section. The compressor section compresses the air and delivers it into a combustion section. In the combustion section, air and fuel are mixed and combusted. Products of combustion pass downstream over turbines, and then outwardly through a nozzle.

It is known in the prior art to vary the cross-sectional area of the nozzle by having flaps that pivot inwardly and outwardly. Typically, a plurality of circumferentially spaced flaps and seals are positioned upstream of a throat, and are called the convergent flaps and seals. Downstream of the throat are divergent flaps and seals. The convergent flaps and seals not only move to define the throat area, but they also provide a block for the products of combustion reaching a housing outboard of the flaps and seals.

In the convergent flaps and seals, a liner typically faces the products of combustion. The liner is connected by a bracket to the flap or seal. Traditionally, the bracket has been welded to the hot liner. The bracket is then bolted to the cooler flap or seal.

In the prior art, the brackets have proved challenging to mount to the hot liner. In particular, the liner extends over a portion of the length of the nozzle, and as one moves downstream in the nozzle, the liner is subject to greater heat. The net effect is that the liner will tend to approach gas path temperatures, whereas the bracket will tend to approach the cooler temperature of the cooling air.

At any rate, the bracket is subject to a thermal gradient along the length of its connection to the hot liner. The bracket has been welded along its entire length to the hot sheet. This provides a relatively rigid connection which is not able to adjust to thermal gradiations. In the prior art, very thermally resistant materials (having a low coefficient of thermal expansion) have been utilized for the bracket and the hot plate. However, this sometimes proves to be an undesirable constraint.

Rivet connections are known, wherein there is clearance provided between the rivet and the surfaces being held by the rivet. This clearance allows some relative expansion between the various components to allow for thermal gradiation. Such connections have not been utilized, however, in the nozzle and, more particularly, to connect a bracket to a liner.

SUMMARY OF THE INVENTION

The bracket is preferably attached to the liner with a plurality of rivets. The rivets extend through openings in the bracket that are elongated such that the opening in the bracket is longer along one axis than it is in a direction perpendicular to this direction. This is because most thermal expansion will tend to be along this direction and is a function of each rivet's position relative to the thermal ground of the liner. Further, a separate collar is positioned between the rivet and the bracket to allow the bracket thermal freedom in the direction parallel to the plane of the liner. A small clearance between the collar and the bracket ensures a loose fit when tolerances are factored in. Thus, it could be said, the rivet connection between the bracket and the liner allows for planar expansion in two directions. Still, a secure connection is provided.

These and other features of the present invention can be best understood from the following specification and drawings, the following of which is a brief description.

DETAILED DESCRIPTION OF THE PREFERRED EMBODIMENT

Figure 1:
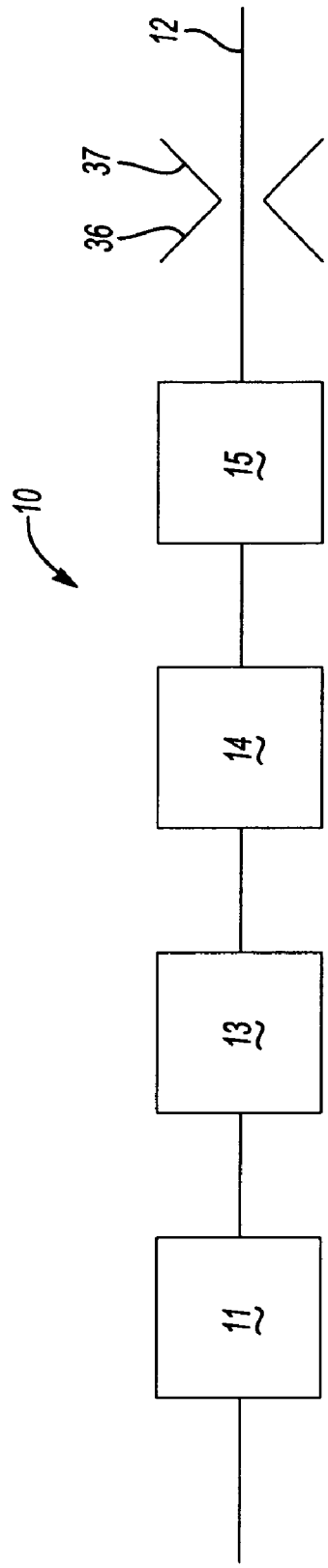
FIG. 1 is a cross-sectional view of a jet engine as known in the prior art.

FIG. 1 shows a gas turbine engine 10. As known, a fan section 11 moves air and rotates about an axial center line 12. A compressor section 13, a combustion section 14, and a turbine section 15 are also centered on the axial center line 12. A nozzle section of the turbine discharges gas downstream. A convergent section 36 leads into a throat and a divergent section 31 leads away. FIG. 1 is a schematic view, however, it does show the main components of the gas turbine engine.

Figure 2:
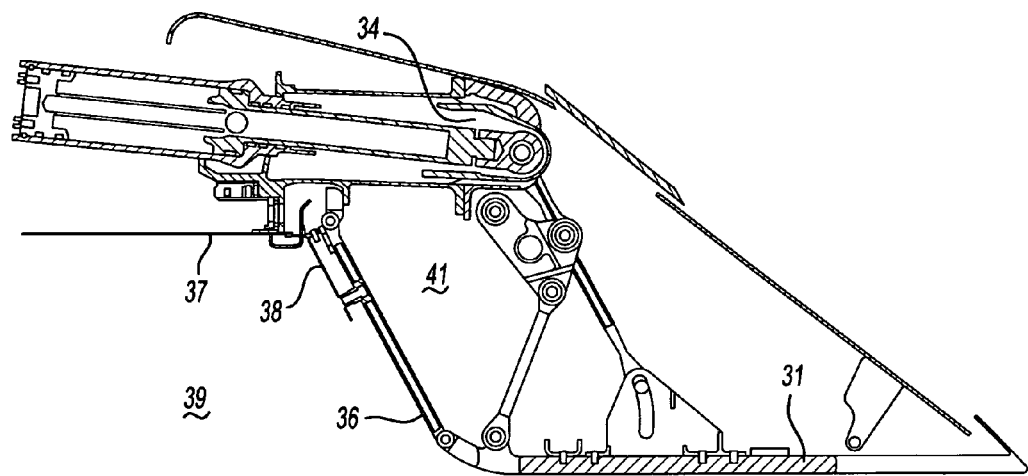
FIG. 2 shows a portion of a structure for adjusting the cross-sectional area of a nozzle.

FIG. 2 shows a prior art structure to change a cross-sectional area of the nozzle. As known, an actuator 34 drives a piston to cause the divergent section 31 and the convergent section 36 to pivot to change the cross-sectional area of the throat between the two. This structure is shown schematically, and may be as known in the art.

As shown at 36, convergent flaps and seals extend from a pivotal connection to the divergent section 31, and upwardly to a housing 37. This structure prevents hot gasses from an area 39 inward of the convergent section 36 from reaching a housing 41 housing the linkages and actuator 34. As known, a liner 38 faces the hot gas, and provides some thermal protection for the relatively cool flap and seals 36.

Figure 3:
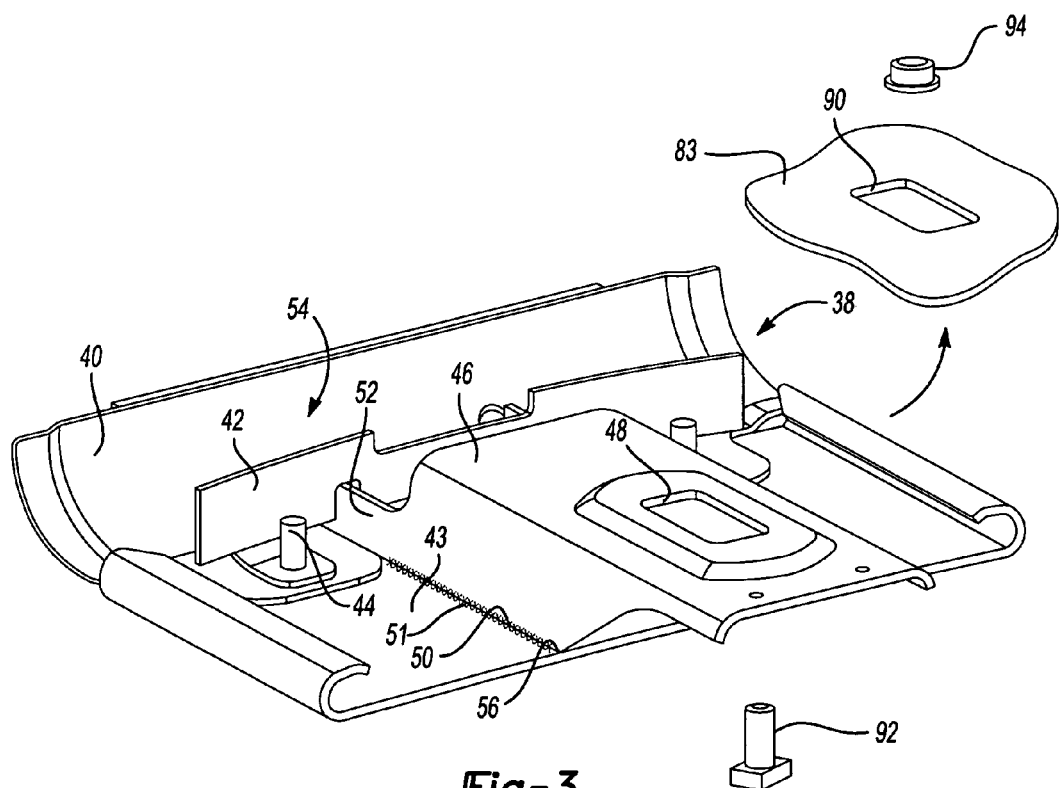
FIG. 3 shows a portion of a liner attachment as known in the prior art.

As shown at 38 in FIG. 3, in the prior art, this liner included a plate 40, a separate dam 42, and rivets 44 attaching the plate 40 to an underlying plate 43.

A bracket 46 includes an opening 48 to secure the liner 38 to the flap or seal 83. As shown schematically in FIG. 3, the flap or seal 83 has a slot 90. A bolt 92 extends through the slots 48 and 90 and receives a nut 94 to secure the bracket to the liner 83. This structure may be as disclosed in a co-pending application entitled "Quick Change Fastener System for Attaching liner Bracket to Convergent Flap and Seal ion Turbine Nozzle," filed on even date herewith and assigned Ser. No. 11/529,836.

In addition, a lower surface 50 of the bracket 46 is welded at 51 to the plate 43 along its entire length. A forward portion 52 of the bracket 46 extends beyond the dam 42. As known, the dam 42 provides a pressure differential between an upstream area forward of the dam 42, and a downstream area adjacent to the bracket 46.

As explained above, in this prior art structure, an upstream end 54 of the bracket 46 is cooler than a downstream end 56. Thus, there is a thermal gradient along the lower surface 50 and the weld joint 51. This causes stresses and other challenges. The prior art has addressed these challenges by forming the bracket 46 out of materials such as columbium, which have low coefficients of thermal expansion (CTE). However, recently, it has become desirable to have more freedom in the material selected for the bracket 46. In one bracket, it is desirable to use INCO 625, which has a relatively high CTE.

Figure 4:
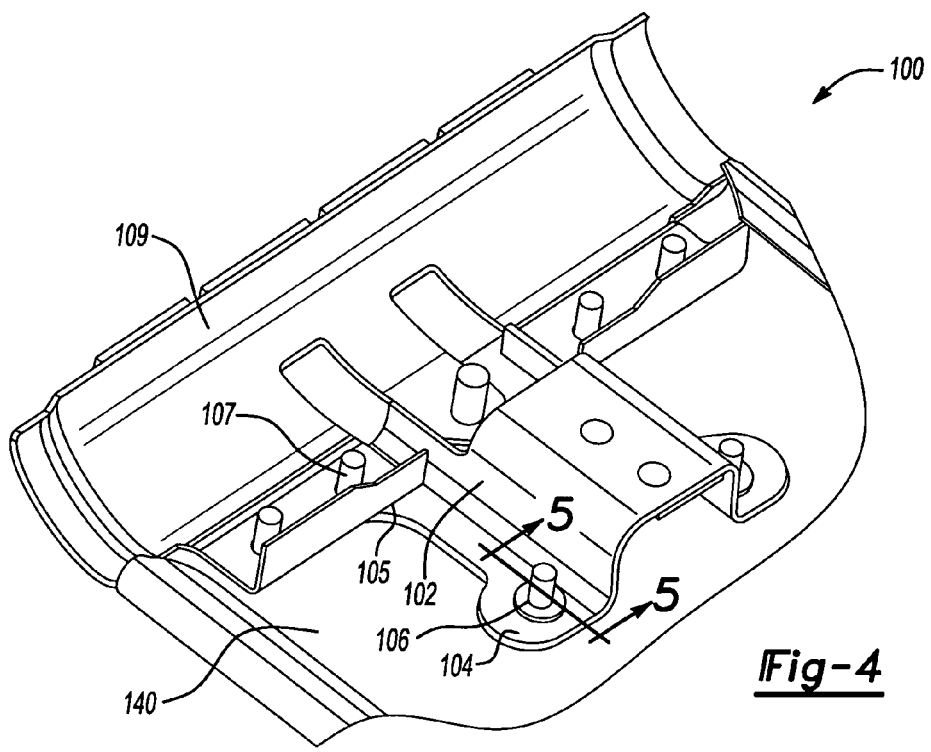
FIG. 4 shows the improved liner attachment.

As shown in FIG. 4, an inventive bracket and liner combination 100 includes a bracket 102 having feet 104 on spaced sides. Although not shown in this figure, other feet 105 are spaced further upstream from the feet 104. A rivet 106 may extend through the feet 104 to secure the bracket to a plate 140 which forms a portion of the liner. Rivets 107 can secure a rear plate 109 to the plate 140. Features with regard to the structure of the plates can be best understood from co-pending patent application entitled "Axially Split Nozzle Liner for Convergent Nozzle," filed on even date herewith and assigned Ser. No. 11/540,279.

The present invention relates to the structure for at least the forward feet 104 and their rivets 106. As shown for example in FIG. 5, a rivet 106 has a head 108, and a foot 110. Foot 110 is deformed to capture a collar 112 outwardly of the bracket 102 and its foot 104. As shown, this also captures the plate 140. An opening 114, which is along an axial centerline (12) of the jet engine, and thus in a direction from upstream heading downstream, is elongated. As can be appreciated from FIG. 5, there is significant clearance between an outer periphery 116 of the collar 112 and an inner periphery 114 of the opening in the bracket 102. This will allow significant thermal expansion of the bracket from this direction toward the direction of the rivet 107.

Figure 5:
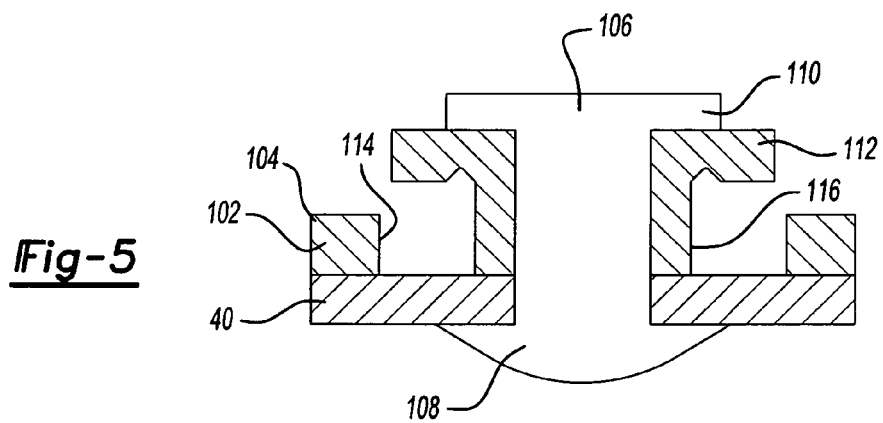
FIG. 5 is a cross-sectional view along line 5-5 as shown in FIG. 4.
Figure 6:
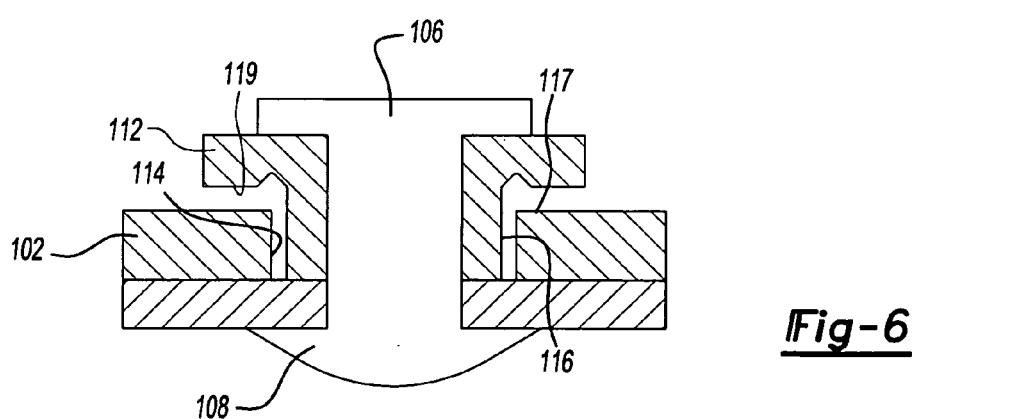
FIG. 6 is a cross-sectional view taken about 90° from the FIG. 5 cross-section.

As shown in FIG. 6, in a direction taken perpendicular to the cross-section of FIG. 5, there is significantly less clearance between the inner surface 114 and the outer surface 116. Further, as can be seen, there is a slight clearance between a radially outer part 117 of the bracket 102 and a radial inner part 119 of the collar 112. This guarantees thermal expansion in this axial direction.

An alternative to this rivet connection is disclosed in a co-pending patent application entitled "Gas Turbine Engine Nozzle Liner With Thermally Compliant Attachment Brackets," filed on even date herewith, and assigned Ser. No. 11/540,310.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A nozzle assembly for a gas turbine engine comprising:
a plurality of divergent flaps that are movable to adjust a cross-sectional area of an outlet of a nozzle;
a plurality of convergent flaps and seals positioned upstream from said divergent flaps, said convergent flaps and seals being positioned to block flow of products of combustion from a location radially inwardly of said plurality of convergent flaps and seals to an internal housing radially outwardly of said convergent flaps and seals; and
said convergent flaps and seals being connected to a liner facing inwardly and toward products of combustion, said liner being attached to said rear flaps and seals by a bracket, said bracket being attached to said liner by a separate mechanical fastener, said separate mechanical fasteners extending from one side of said liner, through an opening in said liner, through an opening in said bracket, and there being clearance between an outer periphery of said separate mechanical fastener and an inner periphery of said opening in said bracket, said clearance being greater in a first direction generally along an axis of said nozzle than in a direction taken perpendicular to said first direction.

2. The nozzle assembly as set forth in claim 1, wherein said mechanical fasteners are rivets.

3. The nozzle assembly as set forth in claim 2, wherein a separate collar is positioned on said rivet, and extending through said opening in said bracket, an outer periphery of said separate collar being spaced from an inner surface of said opening in said bracket by a greater dimension in said first direction than it is spaced from an inner surface periphery of said opening of said bracket in said second direction.

4. The nozzle assembly as set forth in claim 3, wherein said collar having a generally cylindrical boss portion extending along a cylindrical portion of said rivet.

5. The nozzle assembly as set forth in claim 4, wherein said cylindrical boss portion of said collar abutting an inner face of said liner.

6. The nozzle assembly as set forth in claim 3, wherein a radially inner face of said separate collar is spaced from a radially outer face of said bracket to ensure a loose fit for thermal expansion.

7. The nozzle assembly as set forth in claim 1, wherein the clearance between said opening in said bracket and said separate mechanical fastener being greater than a clearance between said separate mechanical fastener and said opening in said liner.

8. A gas turbine engine comprising:
a fan section;
a compressor section;
a combustion section;
a turbine section; and
a nozzle section, said nozzle including a plurality of divergent flaps that are movable to adjust a cross-sectional area of an outlet of a nozzle; a plurality of convergent flaps and seals positioned upstream from said divergent flaps, said convergent flaps and seals being positioned to block flow of products of combustion from a location radially inwardly of said plurality of convergent flaps and seals to an internal housing radially outwardly of said convergent flaps and seals, said convergent flaps and seals being connected to a liner facing inwardly and toward products of combustion, said liner being attached to said convergent flaps and seals by a bracket, said convergent flaps and seals being connected to a liner facing inwardly and toward products of combustion, said liner being attached to said rear flaps and seals by a bracket, said bracket being attached to said liner by a separate mechanical fastener, said separate mechanical fasteners extending from one side of said liner, through an opening in said liner, through an opening in said bracket, and there being clearance between an outer periphery of said separate mechanical fastener and an inner periphery of said opening in said bracket, said clearance being greater in a first direction generally along an axis of said nozzle than in a direction taken perpendicular to said first direction.

9. The gas turbine engine as set forth in claim 8, wherein said mechanical fasteners are rivets.

10. The gas turbine engine as set forth in claim 9, wherein a separate collar is positioned on said rivet, and extending through said opening in said bracket, an outer periphery of said separate collar being spaced from an inner surface of said opening in said bracket by a greater dimension in said first direction than it is spaced from an inner surface periphery of said opening of said bracket in said second direction.

11. The gas turbine engine as set forth in claim 10, wherein said collar having a generally cylindrical boss portion extending along a cylindrical portion of said rivet.

12. The gas turbine engine as set forth in claim 11, wherein said cylindrical boss portion of said collar abutting an inner face of said liner.

13. The gas turbine engine as set forth in claim 10, wherein a radially inner face of said separate collar is spaced from a radially outer space of said bracket to provide room for thermal expansion.

14. The gas turbine engine as set forth in claim 8, wherein the clearance between said opening in said bracket and said separate mechanical fastener being greater than a clearance between said separate mechanical fastener and said opening in said liner.

* * * * *